(12) United States Patent
Layton

(10) Patent No.: US 6,391,195 B1
(45) Date of Patent: May 21, 2002

(54) APPARATUS FOR CLEANING CLEARWATER DRILLING MUDS

(76) Inventor: Kenneth R. Layton, Rural Route,#1, Innisfail, Alberta, T3G 1T6 (CA)

( * ) Notice: Subject to any disclaimer, the term of this patent is extended or adjusted under 35 U.S.C. 154(b) by 0 days.

(21) Appl. No.: 09/746,404

(22) Filed: Dec. 26, 2000

(51) Int. Cl.[7] ............................................. B01D 21/06
(52) U.S. Cl. .................... 210/195.1; 210/201; 210/209; 210/255; 210/519; 210/522; 210/528
(58) Field of Search ............................. 210/195.1, 201, 210/207, 209, 255, 262, 519, 522, 528

(56) References Cited

U.S. PATENT DOCUMENTS

| | | | | |
|---|---|---|---|---|
| 2,090,405 A | * | 8/1937 | Shook ......................... | 210/255 |
| 2,233,641 A | * | 3/1941 | Ramsey ...................... | 210/528 |
| 3,166,502 A | * | 1/1965 | Kelly .......................... | 210/528 |
| 3,298,529 A | * | 1/1967 | Longnecker ................ | 210/528 |
| 3,333,695 A | * | 8/1967 | Van Note .................... | 210/528 |
| 3,349,030 A | * | 10/1967 | Savage ........................ | 210/528 |
| 3,371,788 A | * | 3/1968 | Smith .......................... | 210/528 |
| 3,494,462 A | * | 2/1970 | Baud ........................... | 210/528 |
| 3,800,955 A | * | 4/1974 | Edgerton et al. ........... | 210/528 |
| 5,204,000 A | * | 4/1993 | Steadman et al. .......... | 210/519 |
| 5,340,485 A | * | 8/1994 | Bradley et al. ............. | 210/528 |

OTHER PUBLICATIONS

Steel & McGhee "Water Supply and Sewerage" pp. 227, 231, 540, 1979.*

* cited by examiner

Primary Examiner—Christopher Upton
(74) Attorney, Agent, or Firm—Sean W. Goodwin

(57) ABSTRACT

Apparatus and a process are provided for treating used drilling mud, particularly that produced during clearwater drilling. A structural and highway transportable skid comprises two or more settling tanks connected in succession. Flocculation aids settling of solids to the bottom and clarified liquid forms at the surface. Clarified liquid flows from one tank to the next successive tank. Clarified liquid is produced from the last of the successive settling tanks. The tanks have flat bottoms. Passageways extend between each successive tank for gravity-flowing liquid from one tank to successive settling tank. A solids tank or centrifuge is also mounted within the skid. The solids and settling tanks are located for weight-balancing. A rotational suction is positioned in the bottom of each settling tank and having one or more radially extending conduits which rotate about an axis and have inlets at their distal ends which traverse an inscribed circular path about the periphery of the tank's bottom. Collected solids are directed to the solids tank and a drag conveyor transporting solids product outside the skid.

11 Claims, 7 Drawing Sheets

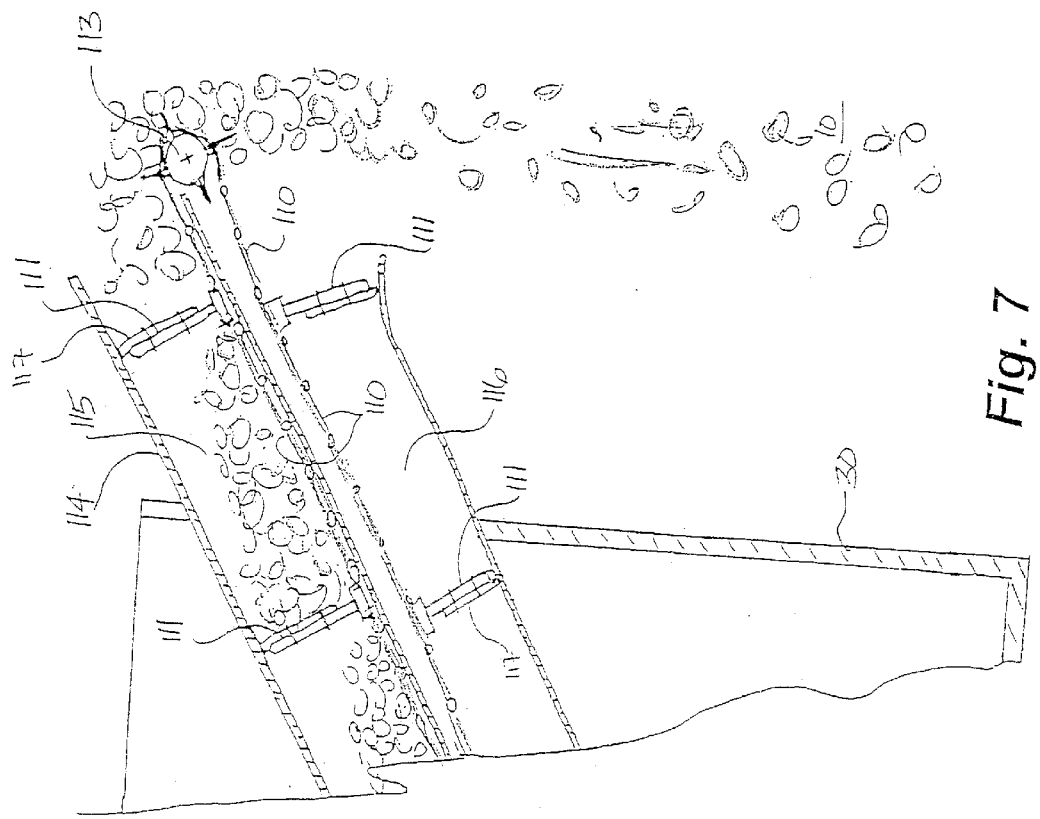
Fig. 7

APPARATUS FOR CLEANING CLEARWATER DRILLING MUDS

FIELD OF THE INVENTION

The invention relates to transportable apparatus and process for separating solids from used drilling mud. Liquid flow is managed in settling tanks while rotating suctions collect and deposit settled solids in a solids tank. Solids are removed by conveyor and clarified water from the tertiary settling tank is recycled to a drilling rig.

BACKGROUND OF THE INVENTION

It is important during drilling of a well to control the fraction of solids in the mud used to facilitate drilling. In Southern Alberta, after surface casing, it is usual to perform drilling using water as the mud liquid for several days until gel muds are required to carry finer solids. Drilling with water is called clearwater drilling and results in fast rates of penetration while it can be used.

Solids are removed from the water so that it can be economically and environmentally recycled for re-use in the drilling process. Further, excessive amounts of solids can reduce the rate of drilling, and contaminate formations.

Prior art systems include landfarming of the used mud, the use of pits to separate solids from the mud or specialized equipment. Equipment used to separate solids from drilling mud include expensive centrifuge technology or a complicated combination of shakers, de-sand and de-silter hydroclones, settlers, floc treatment and augers.

If solids-removal equipment is to be used, because it is impractical or undesirable to use pits, then it becomes necessary to ship the equipment to the site.

Others have attempted to provide a single skid mounted apparatus for providing all the components necessary to treat used drilling mud and returned a clarified liquid for reuse in an active mud system. For example, as disclosed in U.S. Pat. No. 4,536,286 to Nugent, there is a need for a transportable waste treatment which:

Is completely mobile;
  Is capable of treating high mud volumes;
  Is self-contained having chemical storage, chemical pumps, sludge pumps, water pumps, laboratory, centrifuge, conveyors etc;
  has weight, height and width suitable for highway travel; and
  is capable of full operation shortly after delivery to the site.

Nugent discloses a skid incorporating three settling tanks and two chemical tanks for flocculation. Waste liquids containing solids enter a first settling tank and are mixed with flocculation chemicals. Solids settle to the tapered bottom of the tank for collection by a suction located at the apex of the tank bottom. Partially clarified liquid from the first settling tank overflows a weir to the next adjacent settling tank and similarly for the second to the third settling tank.

In U.S. Pat. No. 5,582,727 to Foster, a single structural skid houses four settling tanks. Each tank is equipped with a shaker and a de-silter. Used drilling mud is routed sequentially from tank to tank. Partially clarified liquid is decanted over weirs to each tank in succession. Fixed suction pumps extract settled solids from the bottom of each tank and route them to the de-silter of each additional and successive tank. Foster does not practice flocculation.

It is the applicant's experience that one cannot use conical bottom tanks due to the resultant increase in height. An example of apparatus using conical tanks include U.S. Pat. No. 4,388,195 to von Hagel et al. which excavates a ground installation to accommodate the conical bottom.

Excess height is unacceptable due to the height restrictions for shipping on most major roadways. Typically, one would transport the separation equipment by trailer. To avoid the associated cost of integrating the apparatus with a trailer and to avoid monopolizing an expensive trailer by leaving it onsite under the separation apparatus, the separation apparatus is typically an independent skid removeably located on the trailer.

Further, once in use, the tank significantly increases in weight and is subject to settling, complicating the separation flow of liquids within the apparatus.

The prior art does not disclose a process or apparatus which is capable of minimizing the equipment, size and weight of the skid through implementation of apparatus and process for optimization of solids removal, or to distribute the weight of the overall structure to avoid imbalance and uneven settling on soft ground.

SUMMARY OF THE INVENTION

Generally the apparatus and method provide means for treating drilling mud so as to separate solids from liquid.

The apparatus is integrated into a single transportable unit. Factors contributing to the ability to provide an effective and transportable treater include novel flow path management in and between two or more settling tanks, removal of settled solids without the need for conical tank bottoms, effective solids production and weight balancing to limit uneven settling.

Some of the features include:
  providing all the treatment tanks on a single structural frame or "skid";
  providing a system where solids are continuously removed and clarified liquid is produced;
  increasing the effective residence time for the settling of particulate solids from the used mud by maximising the flow path of the mud through each settling tank;
  maximizing the settling process by managing the conveyance of solids-containing liquid between settling tanks; and finally
  balancing the weight of the skid through proper physical arrangement of the separate tanks based on their individual and predictable operating weights;

The apparatus and process is particularly well suited for treating the mud produced from clearwater drilling section, de-watering of drilling muds, and cleanup of rig ditch water.

In particular, the present invention collects settled solids from the flat bottom of each tank by rotating one or more radially and horizontally extending conduits about an axis so that the distal end of each conduit traverses an inscribed circular path about the periphery of the tank's bottom, the conduits having one or more inlets facing the tank bottom and inducing suction on the conduits so as to draw settled solids into the conduits. In another aspect, the arrangement and construction of the tanks enables management of the flow of solids-containing liquids to maximize retention time of the fluids. Most preferably, this is achieved by positioning the settling tank's liquid inlet and liquid outlets along a common wall and spacing them laterally as far apart as possible so that flow path of liquid from the inlet to the outlet of the settling tank encompasses substantially the entire settling tank. Additionally, clarified liquid from each tank's outlet flow, via gravity, from a point adjacent one tank's liquid surface, through inclined conduits to the inlet of the successive settling tank.

In a broad apparatus aspect then the invention comprises a skid for treating used drilling mud containing solids and liquid, the apparatus comprising two or more settling tanks, each settling tank having a flat bottom the liquid inlets and liquid outlets of each settling tank being lower than their respective liquid surfaces and being spaced laterally apart, introduced solids settling to the bottom of each tank and clarified liquid forming adjacent the liquid's surface, the clarified liquid being produced as a clarified liquid product from the liquid outlet of the last of the successive settling tanks, there also being one or more passageways for gravity-flowing clarified liquid from the liquid outlet of one settling tank to the liquid inlet of its successive settling tank. A solids tank also forms part of the skid and accepts settled solids produced from the bottom of the settling tanks. Settling tank solids are collected using one or more conduits positioned in the bottom of each settling tank, each conduit extending radially and horizontally along the flat bottom from a rotational axis and having an inlet at its distal end which rotates with the conduit about the rotational axis so as to traverse an inscribed circular path about the periphery of the tank's bottom. A pump creates a suction in the conduit for drawing collected solids from the tank bottom into the inlet of each conduit, the solids then being conducted through conduit means for transporting settled solids from the suction conduits to the solids tank. Finally, a conveyor has its inlet located at the bottom of the solids tank and transports solids product to an outlet located outside the skid for discharging the solids product.

Optionally, and to satisfy industry's preference for current technology and reluctance to introduce a settling means to provide a dewatered, product, a centrifuge may be used in place of the solids tank.

Preferably, the passageways extending between a settling tank and its successive settling tank comprise one or more inclined conduits.

More preferably, the liquid inlet and outlets of each settling tank are spaced laterally along the same wall. Accordingly, the inlet of the first settling tank is preferably positioned along about the middle of an enclosing wall for directing used mud outwardly into the middle of the first settling tank and the outlets of the first settling tank are two ports are spaced far as possible from the inlet and positioned either side of the inlet so that the flow path of the used mud must be substantially outwardly towards the opposing enclosing wall and curling back to the two ports as two streams, for maximizing the length of the flow path. In combination with the inclined conduits, this permits an ideal complementary arrangement for the successive settling tank wherein the outlet of the successive settling tank is positioned at about the middle of its enclosing wall facing the first settling tank and wherein it inlet is two ports positioned as far apart as possible on either side of the outlet and along the same facing enclosing wall as the outlet so that the flow path must be two streams flowing substantially outwardly to the enclosing wall opposing the facing enclosing wall for curling back along the middle of the successive settling tank to its outlet, again for maximizing the length of the flow path.

Knowing the probable weight of the tanks during operation, the solids tank and settling tanks can be preferably pre-arranged on the skid so that the weight of the settling tanks when containing liquid and the solids tank when containing solids is balanced along the skid.

The above apparatus enables practicing of a novel method of treating used mud liquid which comprises:

providing a transportable skid having a solids tank, a first settling tank and at least one successive settling tank, each settling tank having a flat bottom;

establishing a liquid level and a diminishing liquid surface in each of the settling tanks;

spacing the liquid inlet and liquid outlets of a settling tank laterally apart for maximal retention time of the liquid;

introducing used mud to the first settling tank;

settling solids to the bottom of the first settling tank and forming an upper layer of clarified liquid;

gravity-flowing clarified liquid from each tank's outlet to each successive settling tank;

collecting settled solids from the bottom of each tank by rotating one or more radially and horizontally extending conduits about an axis so that the distal end of each conduit traverses an inscribed circular path about the periphery of the tank's bottom, the conduits having one or more inlets facing the tank bottom and inducing suction on the conduits so as to draw settled solids into the conduits; and conveying settled solids to the solids tank;

withdrawing clarified liquid as a clarified liquid product from a point adjacent the liquid surface of the last of the successive settling tanks; and conveying the solids out of the bottom of the solids tank to location located outside the skid for discharging the solids product.

BRIEF DESCRIPTION OF THE DRAWINGS

FIG. 7 is a partial and exploded view of the drag conveyor used for removing solids from the solids tank;

DETAILED DESCRIPTION OF THE PREFERRED EMBODIMENT

Figure 1:
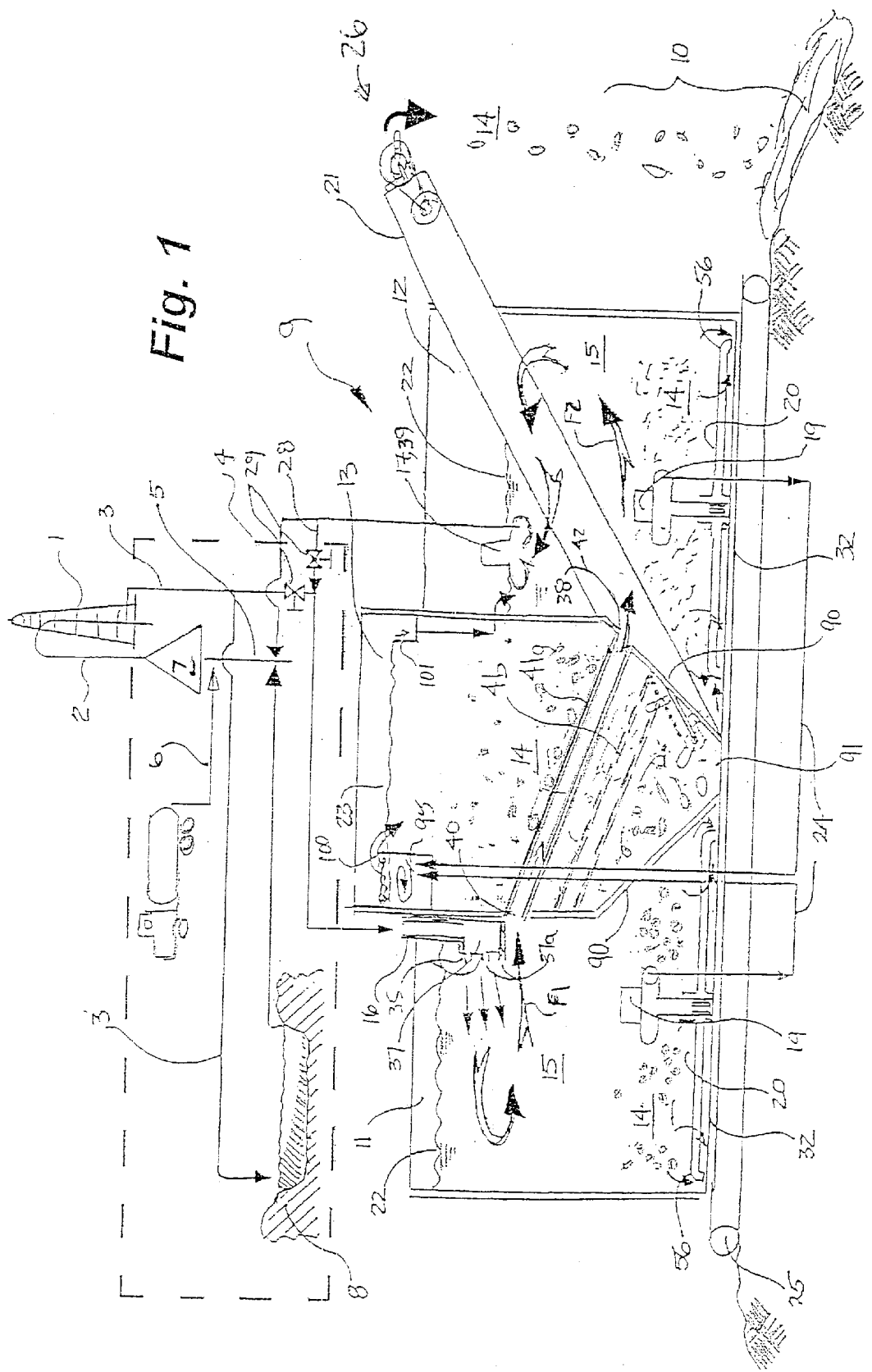
FIG. 1 is a cross-sectional side view of the apparatus of a two settling tank embodiment of the invention.

Having reference to FIG. 1, a drilling rig 1 is depicted. During certain phases of drilling a well, the drilling rig 1 utilizes clear water as drilling mud 2. Used mud 3 returns from the well bearing solids. The used mud 3 is treated in an active mud system 4 for removing solids and producing a clarified water product 5 for reuse by the drilling rig 1. Reuse of water reduces the need for make-up water 6. Prior to use in the well, the clarified water 5 may be combined with mud additives 7.

In conventional active mud system 4, a settling pit 8 may be used which accepts used mud 3 and returns clarified liquid 5.

Generally

Apparatus 9 is provided which replaces the pit 8 in the active mud system 4. The apparatus 9 treats used drilling mud 3 to produce a thickened, substantially solids product 10 and a clarified liquid 5 for return to the active mud system 4. The apparatus 9 comprises two or more settling tanks 11, 12 and a solids tank 13, which are integrated into a single structural skid 25. The skid 25 and integrated tanks 11, 12, 13 have overall dimensions and weight suitable for transport over public roads. Typically the height of the apparatus load onto a trailer must be less than 16' in height so as to clear overpasses.

The used mud 3 comprises solids 14 and liquid 15. Used mud 3 is introduced to a first settling tank 11 via a liquid inlet 16 and is subjected to gravity and flocculation setting. The first settling tank 11 produces settled solids 14 and a partially clarified liquid 15. The partially clarified liquid 15 is directed to a successive settling tank 12 for producing more settled solids 14 and a more highly clarified product 15 and so on.

The clarified liquid 15 is produced as clarified liquid product 5 by pump 17 in the last of the successive settling tanks. Clarified liquid 15 is recycled to the liquid inlet 16 to ensure fluidity of the incoming used mud 3.

Figure 2:
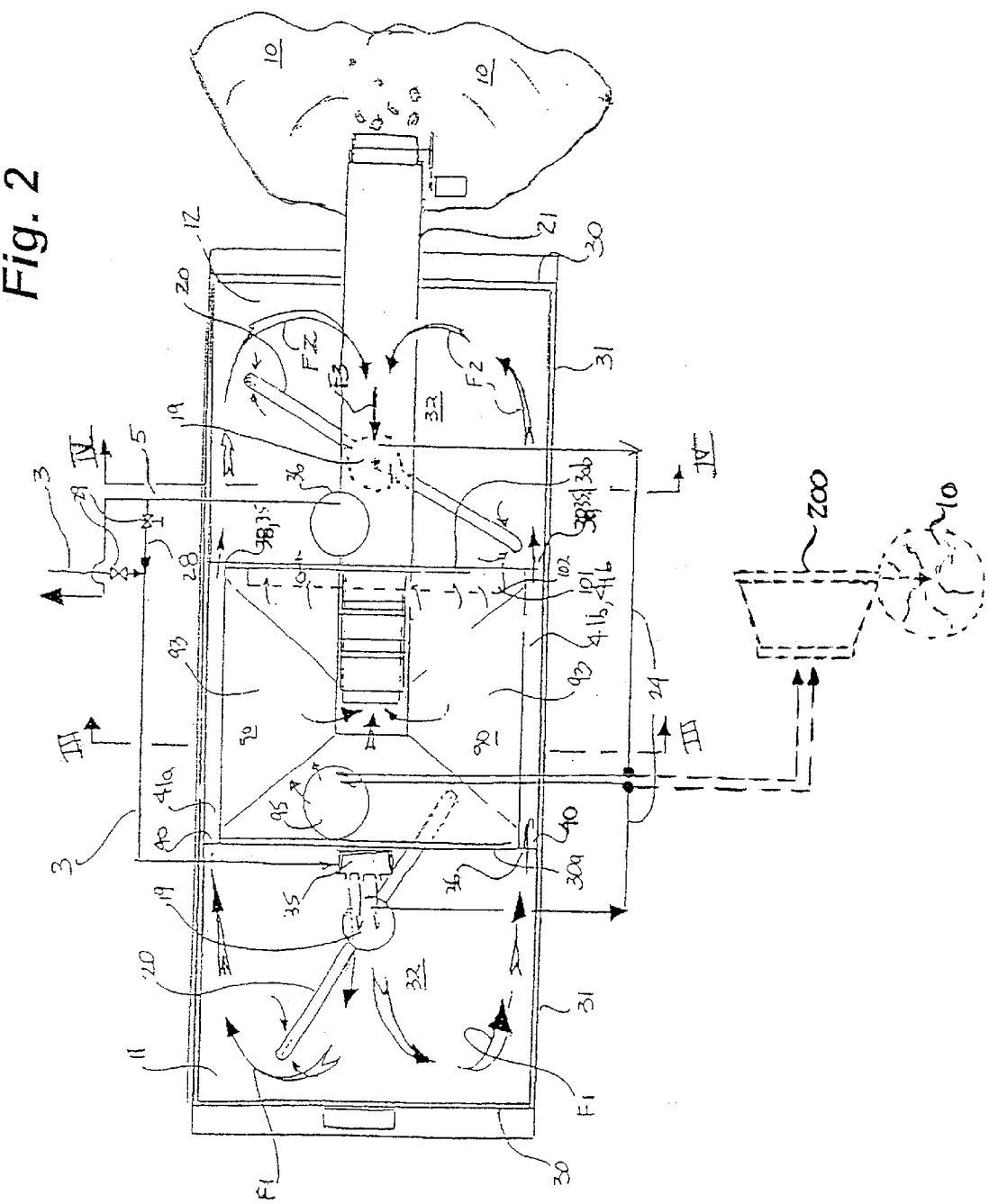
FIG. 2 is a top view of the apparatus depicted in FIG. 1.

Pumps 19 fitted with rotating suctions 20 are provided at the flat bottom of each of the settling tanks 11, 12 to collect and direct settled solids 14 to the solids tank 13, or optionally to a centrifuge 200 as shown in dotted lines on FIG. 2. A drag conveyor 21 is provided in the solids tank 13 to produce the solids product 10 external to the tanks 11, 12 and skid 25.

First Embodiment—Two Settling Tanks

More particularly, a first settling tank 11, a second settling tank 12, and a solids tank 13 are integrated to form part of the structure of the skid 25. The settling tanks 11, 12 are filled with liquid 15 having liquid surface 22 in each tank 11, 12. The solids tank 13 is filled with solids 14 and has a liquid surface 23. The tanks 11, 12, 13 are arranged for weight-balancing purposes to minimize uneven settling of the skid 25 on site. The solids tank 13 is anticipated to be the heaviest tank. Next heaviest is the first settling tank 11, as it has the highest liquid level 22 and greatest density of solids 14 in the used mud 3. The lightest tank is the last or second settling tank 12. Accordingly, for the three-tank arrangement of the first embodiment, the solids tank 13 is located in between the two lighter settling tanks 11, 12.

Used drilling mud 3 and flocculation chemicals, such as polymer, are co-introduced to the settling tanks 11, 12 with the used mud 3 for facilitating settling. The used mud 3, and liquid 15 containing solids 14 are treated with chemicals to form floc. Solids and floc generally are referred to herein as solids 14. As stated earlier, clarified liquid 15 is recycled through conduit 28 to the liquid inlet 16 to ensure fluidity of the incoming used mud 3. Balancing valves 29 are on flows of incoming used mud 3 and recycled liquid 15 to minimize clarified liquid use.

Preferably, flocculating chemicals are added to the used drilling mud prior to the first settling tank 11 and to the solids 14 flow prior to entering the solids tank 13.

Settling of the solids 14 is affected by the success of the flocculation process and by providing long residence time. Generally, residence time is most affected by the volume of the tanks 11, 12. Despite the tank volume however, if the flow path F1 of the used mud 3 short-circuits the tank's volume and instead travels directly from the its inlet to its outlet, the residence time can be significantly and negatively impacted. This flow path F1 can be beneficially manipulated by maximizing its length by urging the liquid 15 to traverse as much of the tank 11, 12 as possible.

Solids 14 settling in the first and second settling tanks 11, 12 and the solids tank 13 are produced using one of, or a combination of gravity settling of the solids 14 or settling of the floc.

Solids 14 settle to the bottom of first settling tank 11 leaving partially clarified liquids 15 which are recovered from a point adjacent the liquid surface 22 of the first settling tank 11. The partially clarified liquids are routed to the next successive or second settling tank 12. Additional solids 14 settle to the bottom of the second settling tank 12. Liquid 15 is recovered from a point adjacent the liquid's surface 22 of the second settling tank 12. Generally piping for solids 14, liquids 15 and flocculating chemicals is routed through end walls 30 for most effective space utilization and heat considerations. Steam tracing (not shown) is provided for winter operation.

Pump 17 is used to pump the clarified liquid 15 as a product 5 for return to the active mud system 4.

Settled solids 14 which are collected from the bottoms of both the first and second settling tanks 11, 12 are co-produced with some liquid 15 using pumps 17 and are routed through piping 24 to the solids tank 13.

The settling tanks 11, 12 are rectangular in plan, having end walls 30, side walls 31 and flat bottoms 32. The first settling tank 11 shares an internal end wall 30a with the solids tank 13. The second settling tank 12 shares an internal end wall 30b with the solids tank 13.

Each settling tank 11, 12 has one or more liquid inlets 35 and one or more liquid outlets 36. Reference numerals 35 refer to inlets generally regardless of which of the plurality of settling tanks they appear. Similarly, numeral 36 refers to liquid outlets. The relative positioning of the inlets 35 and outlets 36 aid in settling. While the inlet and outlets can be located on opposing walls, longer residence time and thus more effective settling can be achieved when the inlets 35 and outlets 36 are located at the same wall 30. The inlet 35 and outlet 36 are spaced as far away as possible from each other on that wall 30. The inlet 35 is capable of directing the fluids 15 passing therethrough away from the wall 30.

Preferably, the first settling tank 11 has one liquid inlet 35 and two liquid outlets 36. The liquid inlet 35 is a distributor 37 located at the middle of a wall, preferably the internal end wall 30a. The two liquid outlets 36 are spaced on either side of the liquid inlet 35, at the peripheral edges of the internal end wall 30a adjacent the side walls 31. Used drilling mud 3 is introduced to the first settling tank 11 through the distributor 37 which is located just below the surface of the liquid level 22. The distributor 37 is a rectangular box having a plurality of nozzles or ports 37a for discharging mud 3 substantially horizontally or perpendicular to the end wall 30a. The distributor 37 is vertically adjustable for discharging used mud 3 below the surface of the liquid 22 regardless of its level.

Accordingly, and as shown in FIG. 2, in the first settling tank 11, the used mud 3 follows a flow path F1 which takes it outwardly from the distributor 37, generally along the middle of the tank 11 to the opposing end wall 30a and then curls back as two paths along the side walls 31 for exit at the two outlets 36. This arrangement maximizes the mud's flow path F1 and retention time, aiding in the settling process.

Clarified liquid 15 collects at the liquid surface 22 in the first settling tank 11 and, under the influence of gravity, exits the first settling tank 11 through the liquid outlets 36. The liquid outlets 36 form inlets 40 to inclined conduits 41. The conduit inlets 40 are necessarily located below liquid's surface 22. Clarified liquid 15 flows through the liquid outlets 36 and inclined conduits 41 to the second settling tank 12. The inclined conduits 41 have outlets 42 located in the second settling tank 12.

The conduit's outlets 42 are lower in elevation than are their inlets 40. For increased liquid capacity flexibility and processing flow rates, one or more pairs 41a, 41b of inclined conduits 41 are provided at opposing side walls 31 and are spaced vertically. If lower liquid levels are desired, or to facilitate cleaning of the first settling tank 11 after operation, the lower conduit pair 41b can be utilized.

The second settling tank 12 has two liquid inlets 38 and one liquid outlet 39. The liquid outlets 36 from the first settling tank 11 are connected to the two inlets 38 of the second settling tank 12 via the inclined conduits 41. Pump 17 forms the outlet 39 of the second settling tank 12. The liquid inlets 38 and outlet 39 of the second settling tank 12 are located at the same wall, preferably its internal end wall 30b.

The inclined conduit's outlets 42 form the second settling tank's 12 liquid inlets 38 and are located low on its interior end wall 30b, and adjacent its side walls 31. Clarified liquid 15 is recovered and removed by pump 17 located adjacent the middle of the interior wall 30b of the second settling tank 12. Pump 17 draws clarified liquid 15 from adjacent the liquid surface 22 such as with a floating suction or a manually positioned pump.

Referring again to FIG. 2, in the second settling tank 12, the partially clarified liquids 15 follow a flow path F2 which takes them outwardly from two inlets 38, generally along the side walls 31 of the tank to the opposing end wall 30 and then curls back as a single path F3 along the middle of the tank 12 for collection and removal at the single liquid outlet 39 or pump 17. This arrangement maximizes the liquid's flow path F2 and retention time, aiding in the settling process.

The solids pumps 19 direct collected settled solids 14 to the solids tank 13. It is understood that the settled solids 14 are associated with some co-produced tank liquids 15, enabling pumping.

Solids Pump With Rotating Suction Shown generally in FIGS. 1, 2, 4 and 5, each pump 19 has a rotating suction 20 for collection of solids 14 from substantially the entire bottom of the tank. The pump has a vertical suction conduit which extends perpendicularly to the bottom 32 of the tank 11, 12. A propeller-like plurality of radial rotating suction conduits 45 surrounds the vertical suction conduit 44 and rotate about it. The vertical suction conduit 44 has perforations 46 to enable flow between the rotating suctions 20 and the conduit 44 and the pump 19.

More particularly, the rotating suction 20 for each settling tank pump 19 is positioned at the bottom 32 of each tank 11, 12. Each pump 19 and rotating suction 20 has a rotational axis located at the center of each tank bottom 32. The tank bottoms 32 are substantially square for minimizing the dead space outside the inscribed circular path of the rotating suction 20.

Each rotating suction 20 comprises: vertical suction conduit 44, a rotatable pump suction 20, drive means 71 for rotating the suction 20, and means 60 for sealing between the vertical suction conduit 44 and the rotating pump suction 20.

Figure 5:
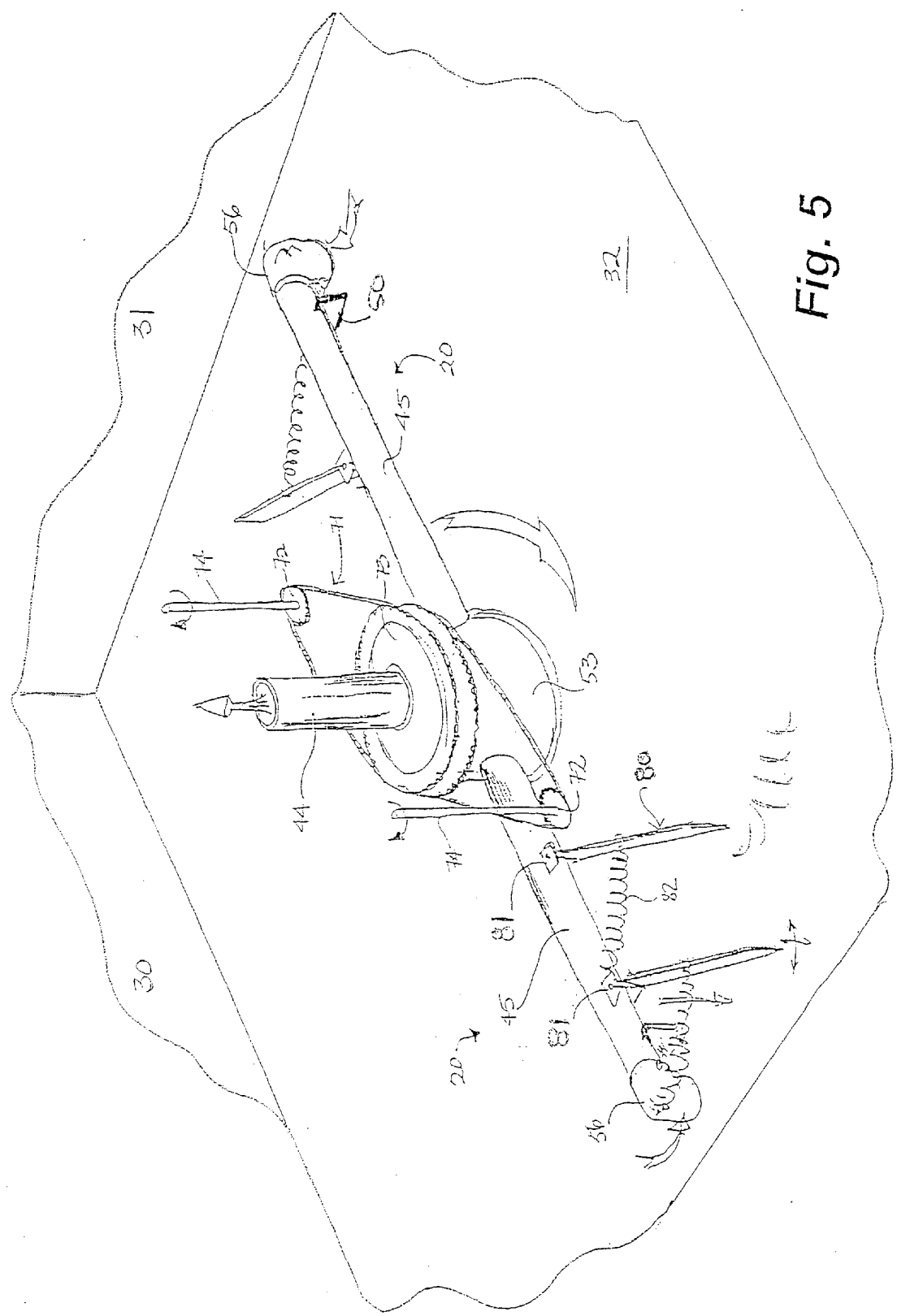
FIG. 5 is a perspective view of a rotating suction of an embodiment of the invention.
Figure 6:
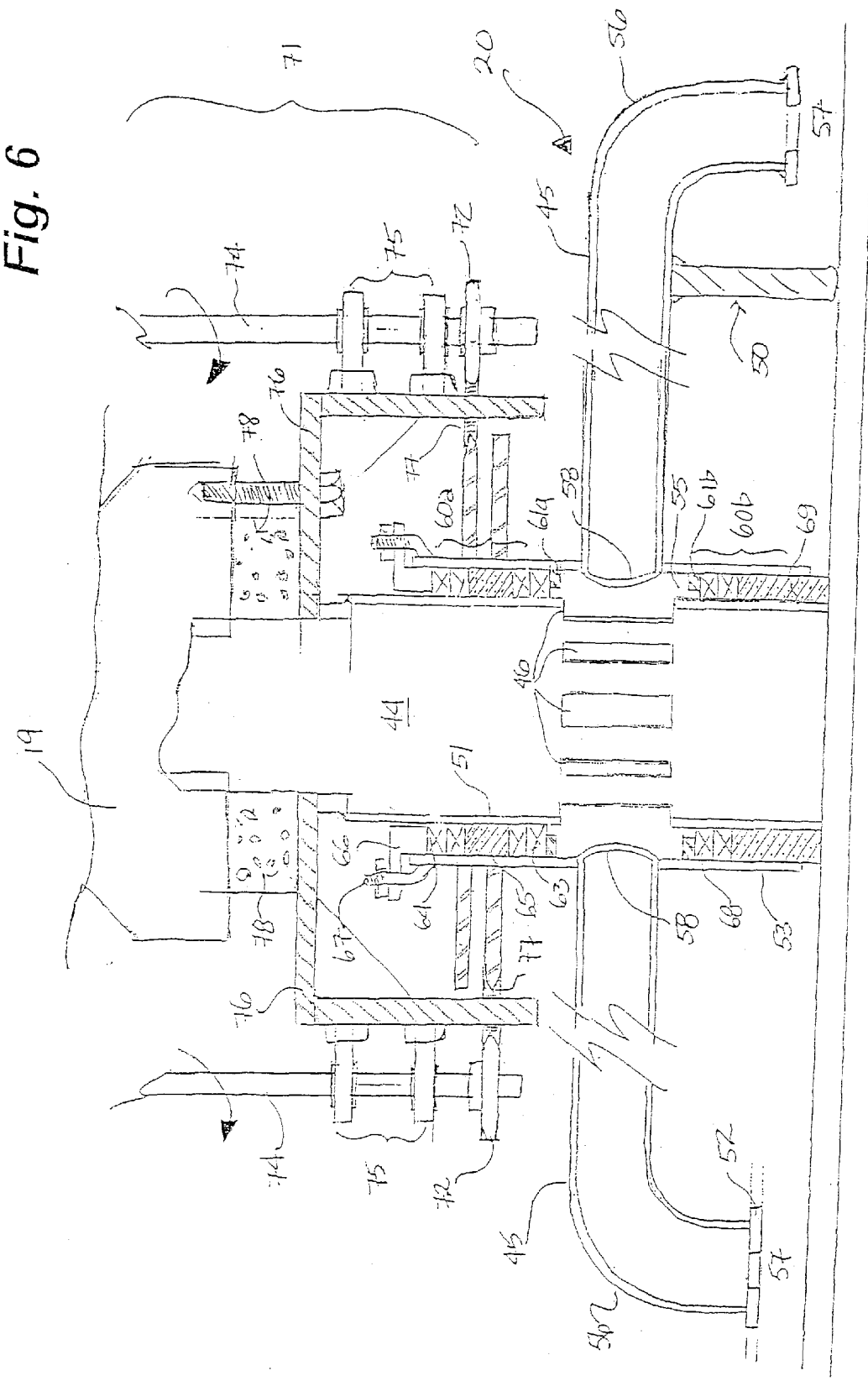
FIG. 6 is a partial cross-sectional view of the rotating suction, illustrating the seal, the drive and the solids pump.

As shown best in FIGS. 5 and 6, the vertical suction conduit 44 comprises a non-rotating first pipe 51 which descends from the suction of each solids pump 19 and is welded to the bottom 32 of the respective first and second settling tanks 11, 12. The first pipe 51 has perforations or apertures 46 spaced circumferentially about the first pipe 51. A second pipe or sleeve 53 is positioned concentrically about the first pipe 51.

One or more suction conduits 45 extend radially and horizontally from the sleeve 53. An annular space 55 is formed between the sleeve 53 and the first pipe 51. A 90 degree elbow 56 is located at the distal end 57 of each suction conduit 45 and is turned downwardly to face the tank bottom 32. Washers 52 can be attached to the elbow inlet for restricting oversize solid material to that which can be accepted by the pump 19. A drag skid 50 may be used to space the suction conduit 45 from the tank bottom 32. An aperture 58 is formed in the sleeve 53 at the connection to each suction conduit 45.

Accordingly when the solids pump 19 creates a suction within the first pipe 51, liquid and associated solids 14 from the tank bottom 32 are drawn up through the elbow 56 and through the suction conduit 45, the sleeve aperture 58, the annulus 55, and through the circumferential apertures 46 and up the first pipe 51 to the solids pump 19.

Upper and lower seals 60a, 60b are provided in the annulus 55 above and below apertures 46 for sealing the annulus 55 between the sleeve 53 and the first pipe 51, ensuring solids 14 are forced to flow into pump 19 through the conduits 45.

Upper and lower rings or shoulders 61a, 61b are located in the annulus 55 and are affixed to the inside wall of the sleeve 53 above the suction conduit 45.

The upper seal 60a comprises a first upper packing set 63 and a second upper packing set 64, placed in the annulus 55 above the apertures 46. The first upper packing set 63 is supported on the upper shoulder 61a. A first Teflon ring 65 is supported on the first upper packing set 63, sandwiched between the first and second upper packing sets 63, 64. Packing compression ring 66 is provided at the top of the sleeve 53 for compressing the upper seal packing sets 63, 64. The ring 66 is tightened, compressing the packing sets 63, 64 using plurality of circumferentially spaced bolts 67.

The lower seal 60b comprises a lower packing set 68 placed in the annulus 55 below the apertures 46. The lower shoulder 61b rests on the lower packing 68. A second Teflon ring 69 is positioned between the lower packing 68 and the tank bottom 32.

When rotating, the weight of the rotating suction 20 is supported by the tank bottom 32. Preferably, a wear plate or Teflon pad (not shown) spaces the second Teflon ring 69 and sleeve 53 from the tank bottom 32.

The weight of the rotating suction 20 compresses the lower packing 68 and ensures a continued seal.

The first and second Teflon rings 65, 69 space the sleeve 53 from the first pipe 51 and ensure concentricity therebetween.

The height of the lower packing 68 and second Teflon ring 69 combined is greater than the height of the sleeve 53 measured from its bottom to the lower shoulder 61b. Accordingly, the sleeve 53 is spaced from the tank bottom 32.

The sleeve 53, and accordingly the suction conduits 45, are rotated so as to enable the suction conduits 45 to traverse and draw settled solids 14 from the entire circumference of an inscribed circular path about the periphery of the tanks bottom 32.

Solids 14 settle across the entire tank bottom 32 and not just at the distal ends 57 of the rotating suction conduits 45. Accordingly, referring to FIG. 5 angled plow plates 80 are provided to urge the solids 14 radially outwardly each revolution to the elbow 56. The plow plates 80 are radially positioned alternately on each suction conduit 45 so that it is not necessary to locate all plates 80 on all suction conduits 45. The plow plates 80 are pinned at a point 81 located on the lee side of the suction conduits 45. The pitch of the plates 80 is controlled by tension springs 82 connected intermediate along the plate 80 and to the suction conduit 45, outboard of the pivotal pin connection 81. The springs 82 enable the plates 80 to deflect when an occasional solid obstruction is struck.

The rotating suctions 20 are rotated using drive means such as dual chain drives 71. The drives themselves and driving sprockets 72 are located in opposing relation for canceling lateral forces. Dual driven sprockets 73 are mounted and stacked vertically on the outer circumference of the sleeve 53. Dual driveshafts 74 are supported on pillow block bearings 75, each driveshaft 74 which rotates the drive sprocket 72. Best seen in FIG. 6, the pillow block bearings 75 are supported from a frame 76 extending from the first pipe. Chains 77 transmit rotation from the driving sprocket 72 to the driven sprocket 73. The frame 76 also supports the pump 19. A resilient seal 78 between the frame 76 and the pump 19 ensures a proper seal.

The rotating suction drives 71 are speed reduced to provide a very low rotational speed of the conduit 54 and low speed at the elbows 55.

The Solids Tank

Figure 3:
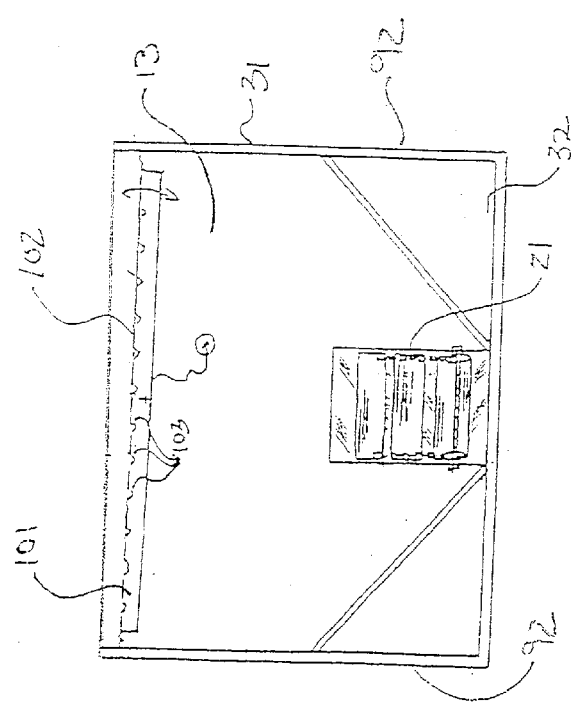
FIG. 3 is a cross-sectional view of the apparatus of FIG. 1 taken along line III—III.

The solids tank 13 is formed with tapered side walls 90, best seen in FIG. 2, for directing solids 14 into the drag conveyor 21 at the bottom 91 of the tank 13. The solids tank's tapered walls 90 are further enclosed within rectangular walls 92 (FIG. 3) to form triangular cross-section cavities or saddle tanks 93 for convenient storage of flocculation chemicals. Flocculation of used mud 3 and liquid 15 to form floc solids is associated with chemicals, mixing pumps, supply pumps and conduits which are conventional in design and is not specifically described.

The drag conveyor 21 extends upwardly from the bottom 91 of the solids tank 13 and extends to a point external to the skid 25 and has an outlet 26 at an elevation higher than the level of solids 14 and clarified liquid 15 present in the solids tank 13. The drag conveyor 21 removes solids 14 from the solids tank 13 without excessive re-liquification of flocculated solids 14.

Preferably a small output hopper and distributor or endless belt (not shown) deposits sawdust or other absorbent for co-mixing with the discharges solids product, improving its handleability.

The solids 14 are introduced tangentially and low in a small cylindrical overflow tank 95. Preferably, one overflow tank 95 can be provided for each settling tank 11, 12.

Figure 9:
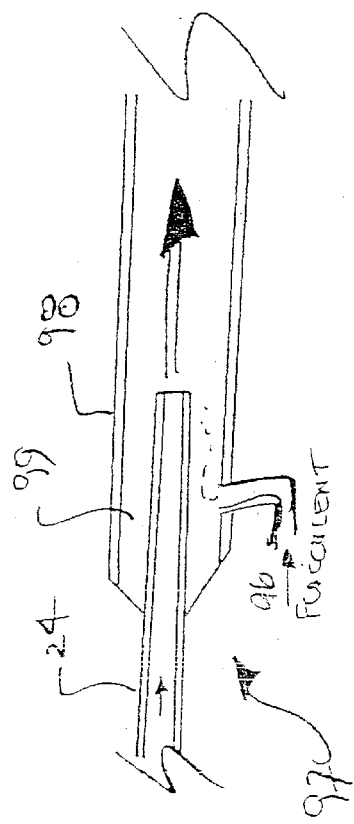
FIG. 9 is a cross-sectional view of the induction fitting for introducing flocculent.
Figure 4:
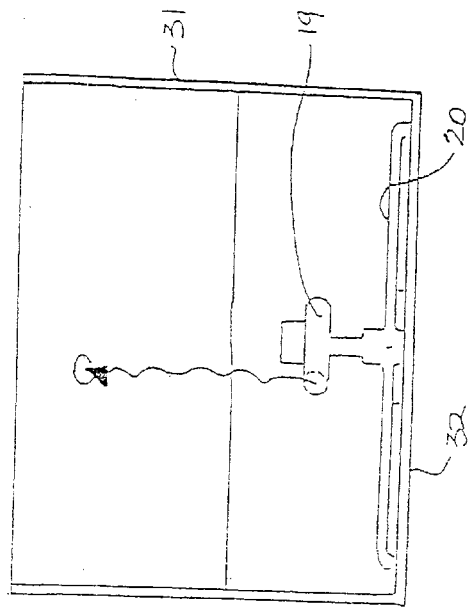
FIG. 4 is a cross-sectional view of the apparatus of FIG. 1 taken along line IV—IV.

Additional flocculation chemicals are introduced to the solids 14 before they enter the overflow tank 95. This is most effectively achieved by injecting flocculent 96 into an induction fitting 97, as shown in FIG. 9.

More specifically, the solids pumps 19 pump solids 14 through piping 24 to the overflow tank 95. The induction fitting 97 comprises a first large-pipe 98 connected to the overflow tank 95. Piping 24 has a smaller diameter for fitting co-extensively into the larger pipe 98, forming an annulus 99 therebetween. Solids 14 are pumped through pipe 24 to exit into the larger pipe 98 prior to entering the overflow tank 95 creating a low pressure zone in the annulus 99 into which flocculation polymer is readily injected.

The tangential and resultant swirling flow in the overflow tank aid in the formation of floc solids 14.

The axis of the overflow tank 95 is positioned vertically so that its upper edge 100 is adjacent the liquid surface 23 in the tank 13 and thus floc and solids 14 spilling over the edge 100 avoiding excessive breakdown of flow or general agitation of the solids 14 and liquid 15.

The collected solids 14 also gravity settle in the solids tank 13. Any clarified liquid 15, co-produced with the solids 14, separate from the solids 14 in the solids tank 13 and spill over an overflow weir 101 and are directed back to the settling tanks 11, 12. The overflow weir 101 is a trough which is pivoted to orient its horizontal overflow lip 102 to the ultimate plane of the liquid should the skid 25 be on an angle. Additionally and with reference to FIG. 3, a plurality of spaced "V" shaped notches 103 in the overflow lip 102 reduces the impact of non-level alignment so that the weir continues to accept liquid 15 from across the tanks surface 23.

The clarified liquid 15 often contains residual flocculation chemical which is usefully applied again to the used mud 3 in the first and second settling tanks 11, 12.

With reference to FIG. 7, the drag conveyor 21 comprises an endless conveyor having dual endless chains 110 with transverse paddles 111 extending between the chains 110 and spaced along it. The conveyor 21 has a tail pulley 112, located in the bottom of the solids tank 13, and a driven head pulley 113 extending beyond the end of the skid 25. As shown in FIGS. 1 and 2, the conveyer 21 extends through the second settling tank 12 and out the outside end wall 30 of the second settling tank 12. The conveyor 21 is enclosed in a housing 114 having two back-to-back upper and lower compartments 115, 116. The paddles 111 drag solids 14 up the upper compartment 115 for discharge at the head pulley 113. The solids-free paddles 111 return in the lower compartment 116 to the solids tank 13 for recharging with fresh solids 14. The housing ensures solids 14 do not co-mix with the contents 15 of the settling tanks 11, 12. Rubber skirting 117 is added to each paddle for improved sealing and minimized backflow. The housing 114 extends to an elevation at least as high as the liquid level 23 in the solids tank 13. Otherwise, hydraulic head causes liquid 15 to leak out the conveyor 21 at the head pulley 113. The paddles 111 are sized to very nearly fill the cross-section of the compartment 115, so as to minimize backflow of conveyed solids 14. The solids 14 (containing floc) could liquefy if permitted to backflow.

In Operation

In operation, used mud 3 is co-introduced with flocculent to the distributor 37 in the first settling tank 11. The used mud 3 flows outwardly into the tank 11 and floc forms. As the liquid 15 including solids 14 (as solids and floc combined) flows outwardly and curls back towards the tank outlets located on the internal end wall, solids 14 settle to the tank bottom 32. The plows 80 of the rotating suctions 20 direct the settled solids 14 to the suction's elbows 56. Pump 19 causes the settled solids 14 to be drawn into the suctions 20 and pumped to the solids tank 13.

Clarified liquid 15 adjacent the liquid's surface 22 flows down the two conduits at the side walls 31 and into the second settling tank 12, partway down its internal end wall. Additional flocculent may be added as the liquid inlet to the second settling tank. The gravity flow avoids riling the solids 14 already settled in the second settling tank 12. The liquid 15 circulates outwardly along the side walls 31 and curls back up the middle of the second settling tank 12 to the centrally located outlet pump back at the internal end wall. Again, additional solids 14 settle to the tank bottom 32. The plows 80 of the rotating suctions 20 direct the settled solids 14 to the suction's elbows 56 and the pump directs the settled solids 14 to the solids tank 13.

Solids 14 entering the solids tank 13 are mixed with additional flocculent and overflows into the solids tank. The solids collect in the solids tank and a small amount of clarified liquid collects at the surface. The clarified liquid overflows a collection weir and is directed back to the settling tanks.

Second Embodiment—Three Settling Tanks

Figure 8:
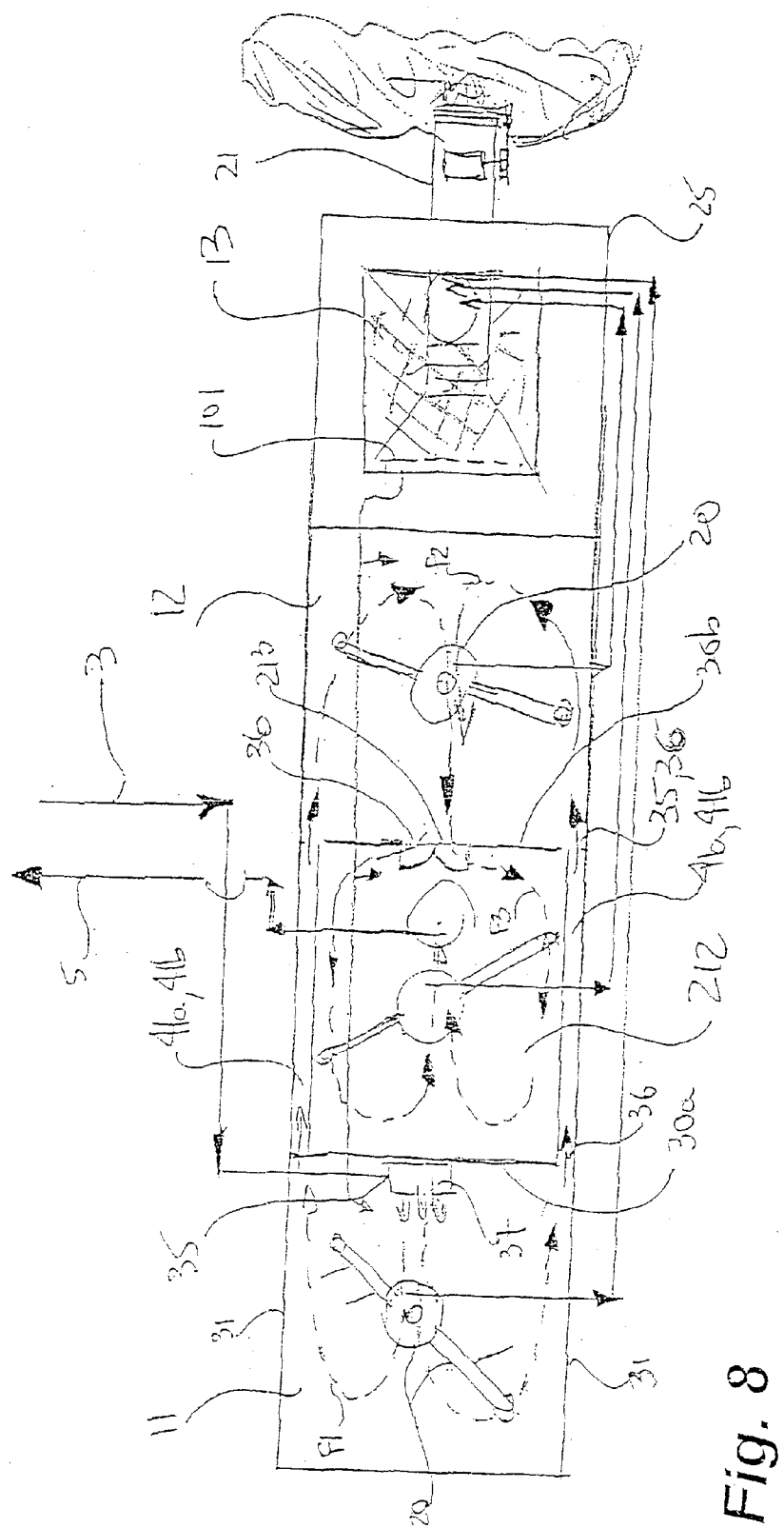
FIG. 8 is a top view of the apparatus of a three settling tank embodiment of the invention.

In a second embodiment, and having reference to FIG. 8, a third settling tank 212 is provided. Note that in the description of this embodiment, the same reference numerals are used as in the first embodiment whenever the function or item is the same. New reference numerals begin in the two hundred series. Used mud 3 is introduced to the first settling tank 11 at its inlet 35 at its internal wall 30a. The mud 3 circulates into the tank 11 and curls back along the side walls 31 and back to the tank outlet 36 on the same internal wall 30a. Solids 14 settle and clarified water 15 flows through inclined conduits 41a, 41b from the outlets 36 of the first settling tank 11 to inlets 35 of the second settling tank 12 along an internal wall 30b. Liquid 15 circulates along the side walls 31 of the second settling tank 12 and curls back along the tank middle to a centralized outlet 36 back at the internal wall 30b. The clarified liquid flows over a vertically adjustable weir 213 and into the third settling tank 212 in succession. The weir 213 utilizes a split discharge to direct the flow F3 of clarified liquid 15 outwardly towards the side walls 31 of the third settling tank 212. Clarified water product 5 is recovered from the liquid surface, intermediate the side walls 31 of the third settling tank 212 in the same manner as it was recovered from the second settling tank 12 in the first embodiment, thereby maximizing the flow path.

From one end of the skid 25 to the other, the tanks are arranged as follows: the solids tank 13, the second settling tank 12, the third settling tank 212 and the first settling tank 11. This arrangement places the heaviest solids tank 13 and first settling tank 11 (highest liquid level) at opposing ends of the skid 25 for better weight distribution. The first settling tank 11 and second settling tanks 212 are spaced so as to incorporate the inclined conduits 41a, 41b therebetween.

EXAMPLE

Several tests were conducted on the invention as it was constructed in the form described in the second embodiment.

The skid had dimensions of 12' by 60' long. Each 12' wide by 12' long and nominally 8' tall settling tank had a capacity of 700 barrels (110 m$^3$). The 8' by 8' by 10' tall solids tank was about 150 barrels in capacity.

Used mud treating capacity was 1.7 m$^3$/min.

Each settling tank had a liquid level or surface about 6" higher than the successive settling tank.

Three pairs of inclined conduits 41 were installed between the first and second settling tanks. The inlets to each conduit were 6" pipe blocked immediately by a butterfly valve for flow control. The discharge for the valve and the bulk of the 12 remaining feet of the conduits were 8" pipe. Each conduit of a pair ran alongside the opposing side walls of the skid.

Each pair of conduits dropped about 2 feet in elevation over its 12' horizontal run. Roughly, the inlets to each of the three pair of conduits were at 7.5, 5.5 and 3.5 feet from the first settling tank's bottom. The outlets from each of the three pair of conduits were at 5.5, 3.5 and 1.5 feet from the second settling tank's bottom. The uppermost pair of conduits had inlets just below the liquid surface of the first settling tank.

Gear reduction for the rotating suctions was provided by two gear box drives of 30:1 each and a sprocket reduction of 5:1 for a total of 4500:1. With a motor speed of 1725 rpm, the rotational speed of the rotating suction was about 0.4 rpm.

Each solids pump in the bottom of the three settling tanks had a capacity of about 0.1 m$^3$/min.

Used mud was fed to the apparatus at 1.7 m$^3$/min through the distributor. The distributor had a box about 6" deep by 12" tall by 12" wide. Sixteen 1" schedule 40 pipe nozzles over the 12×12" face distributed the used mud to the first settling tank.

One of either Percol 757, 351 (tradename) or other suitable flocculent was prepared (at about 4 litres of granulated solid to 7 m$^3$ of water) and was added to the distributor at about 2–50 l/min.

Solids were pumped to the overflow tank. Flocculent was also added to the induction pipe at 2 to 10 l/min. Clarified liquid 15 which flowed back to the settling tanks likely contained residual flocculent.

The drag conveyor was a single conveyor 2 feet wide. The top compartment was about 3.5" tall for accepting the 1' high chain and cross bars supporting 2" flat bar paddles leaving a 0.5" gap. The gap was found to be a bit too large, occasionally resulting in backflow and re-liquification of formed floc. Rubber skirting 117 has since been added to each paddle for improved sealing and minimized backflow.

Solids product was recovered at rates of about 3 m$^3$/hour and clarified liquid product was returned to the active mud system at about 100 m$^3$/hour. Several addition embodiments are contemplated including:

installing the inclined conduits with their outlets located anywhere along a peripheral wall within the subsequent settling tank. Conveniently, as described above, the outlets are located in the end wall adjacent the preceding settling tank. The outlet could exit however at the opposing end wall, as long as the outlet re-directed the liquid flowing therethrough out into the middle of the tank; and installation of a sawdust or other dry solids addition system at the discharge of the drag conveyor.

The embodiments of the invention in which an exclusive privilege or property is claimed are defined as follows:

1. Apparatus for treating used drilling mud containing solids and liquid and producing a solids product and a clarified liquid product comprising:

a first settling tank and at least one additional and successive settling tank, the first settling tank having an enclosing wall which faces its successive settling tank, each settling tank having a flat bottom and containing liquid forming a liquid surface, a used mud liquid inlet spaced apart from a liquid outlet, the inlets and outlets being located below the liquid surface and connected by passageways, the passageways gravity flowing liquid from the outlet of one settling tank to the inlet of the successive settling tank, solids collecting on the flat bottom and clarified liquid forming adjacent the liquid surface wherein;

the inlet of the first settling tank being positioned along about the middle of its facing enclosing wall for directing used mud outwardly into the middle of the first settling tank; and the outlets of the first settling tank are two ports spaced as far as possible from the inlet and positioned either side of the inlet so that the flow path of the used mud must be substantially outwardly towards the opposing enclosing wall and curling back to the two ports as two streams, for maximizing the length of the flow path;

a rotational suction positioned in the bottom of each settling tank, and having one or more horizontal conduits extending radially along the tank's flat bottom and having distal ends with inlets formed therein, the one or more horizontal conduits rotating about a rotational axis so as to traverse an inscribed circular path about the periphery of the tank's bottom;

a pump for drawing collected solids from the tank bottom into the inlet of each conduit; and a discharge for conducting settled solids from the suction conduits to product.

2. The apparatus as recited in claim 1 wherein a settling tank immediately successive to the first settling tank has an enclosing wall which faces the first settling tank;

the outlet of the successive settling tank is positioned at about the middle of its facing enclosing wall for producing clarified liquid therefrom; and the inlet of the successive settling tank is two ports positioned as far apart as possible on either side of the outlet and along the same facing enclosing wall as the outlet so that the flow path of the clarified liquid from the first settling tank must be substantially outwardly to the enclosing wall opposing the facing enclosing wall, as two streams, and curling back along the middle of the successive settling tank to its outlet, for maximizing the length of the flow path.

3. The apparatus as recited in claim 2 wherein the passageways extending between a settling tank and its successive settling tank comprise one or more inclined conduits.

4. The apparatus as recited in claim 1 further comprising a centrifuge for further treating the discharge to produce liquid and a solids product.

5. The apparatus as recited in claim 1 further comprising a flocculent inlet at or before the inlet to the first tank whereby the used mud is co-introduced to the first settling tank with flocculent.

6. The apparatus as recited in claim 1 further comprising a recycling conduit between one of the successive settling tanks and the inlet of the first tank whereby used mud is co-introduced to the first settling tank with clarified liquid.

7. Apparatus for treating used drilling mud containing solids and liquid and producing a solids product and a clarified liquid product comprising:

a first settling tank and at least one additional and successive settling tank, each settling tank having a flat bottom and containing liquid forming a liquid surface, used mud liquid inlet spaced apart from a liquid outlet, the inlets and outlets being located below the liquid surface, solids collecting on the flat bottom and clarified liquid forming adjacent the liquid surface;

passageways between each successive tank, the passageways gravity-flowing liquid from the outlet of one settling tank to the inlet of successive settling tank;

a rotational suction positioned in the bottom of each settling tank, and having one or more horizontal conduits extending radially along the tank's flat bottom and having distal ends with inlets formed therein, the one or more horizontal conduits rotating about a rotational axis so as to traverse an inscribed circular path about the periphery of the tank's bottom, wherein each rotational suction comprises:

a vertical conduit connected to a pump for forming a suction and drawing collected solids from the tank bottom into the inlet of each conduit;

a sleeve positioned concentrically about the vertical conduit and having the one or more horizontal conduits distributed circumferentially thereabout and extending radially therefrom, the sleeve forming an annulus between sleeve and the vertical conduit;

seal means for sealing the annulus so that suction in the vertical conduit creates a suction in the radial conduits; and a discharge for conducting settled solids from the suction conduits to product.

8. Rotating suction apparatus for a flat bottom solid settling tank comprising:

one or more horizontal suction conduits having a distal end and which extend radially along the tank's flat bottom;

a rotational axis about which the suction conduits are rotated so as to traverse an inscribed circular path about the periphery of the tank's bottom;

an outlet at the rotational axis;

a suction inlet at each suction conduit's distal end; and one or more radially positioned plow plates pivotally connected to and biased to angle outwardly from one or more of the horizontal suction conduits so as to urge solids on the flat bottom of the tank radially outwards towards the conduit's distal end inlets, but deflect when they contact with a solid object.

9. Rotating suction apparatus for a flat bottom solid settling tank comprising:

a vertical conduit connected to a pump for forming a suction;

a sleeve positioned concentrically about the vertical conduit, having one or more horizontal suction conduits having distal ends distributed circumferentially thereabout and extending radially therefrom along the tank's flat bottom, the sleeve forming an annulus between the sleeve and the vertical conduit and a rotational axis about which the suction conduits are rotated so as to traverse an inscribed circular path about the periphery of the tank's bottom;

seals for sealing the annulus so that suction in the vertical conduit creates a suction in the radially extending conduits;

an outlet at the vertical conduit; and a suction inlet at each suction conduits distal end.

10. The apparatus as described in claim 9 wherein the vertical conduit comprises a non-rotating first pipe having apertures spaced circumferentially thereabout.

11. Apparatus as described in claim 10 wherein the seals further comprise:

an upper seal located above the apertures for sealing the annulus between the sleeve and the first pipe; and a lower seal located below the apertures for sealing the annulus between the sleeve and the first pipe.

* * * * *